Patented Feb. 12, 1929.

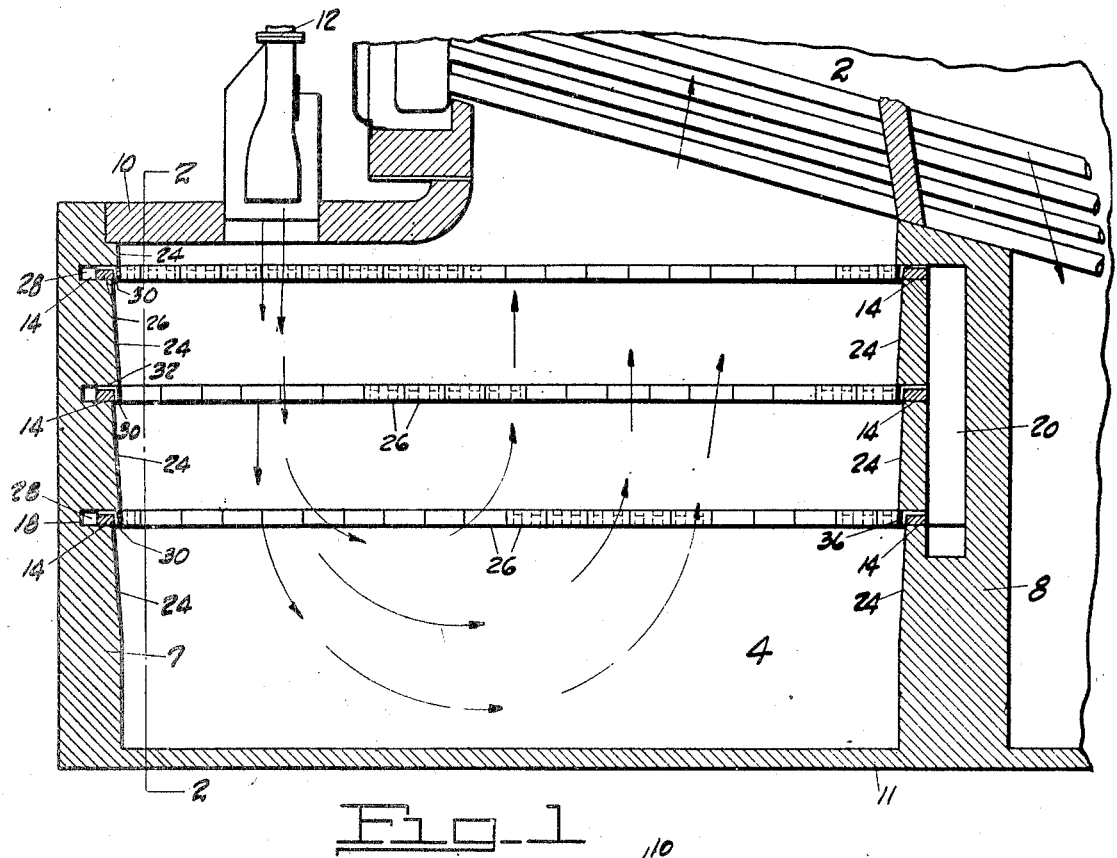
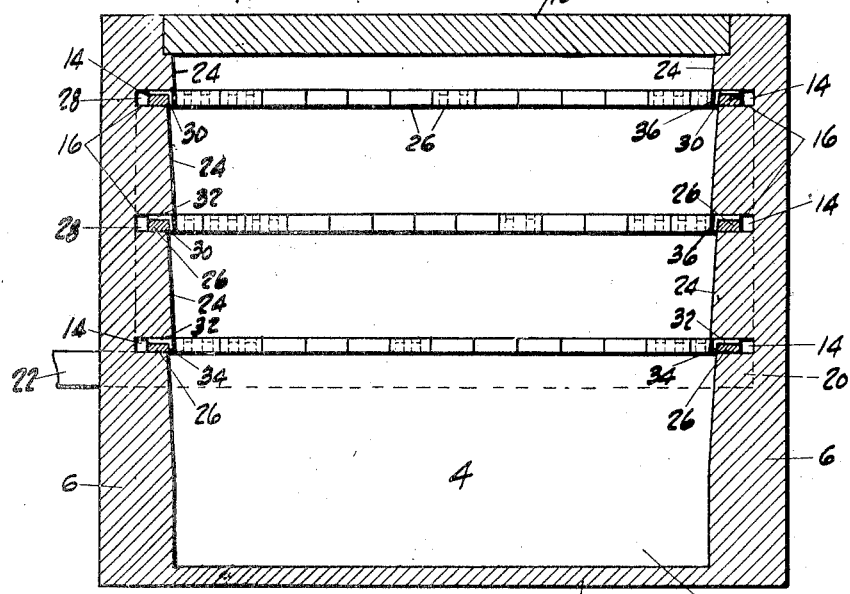

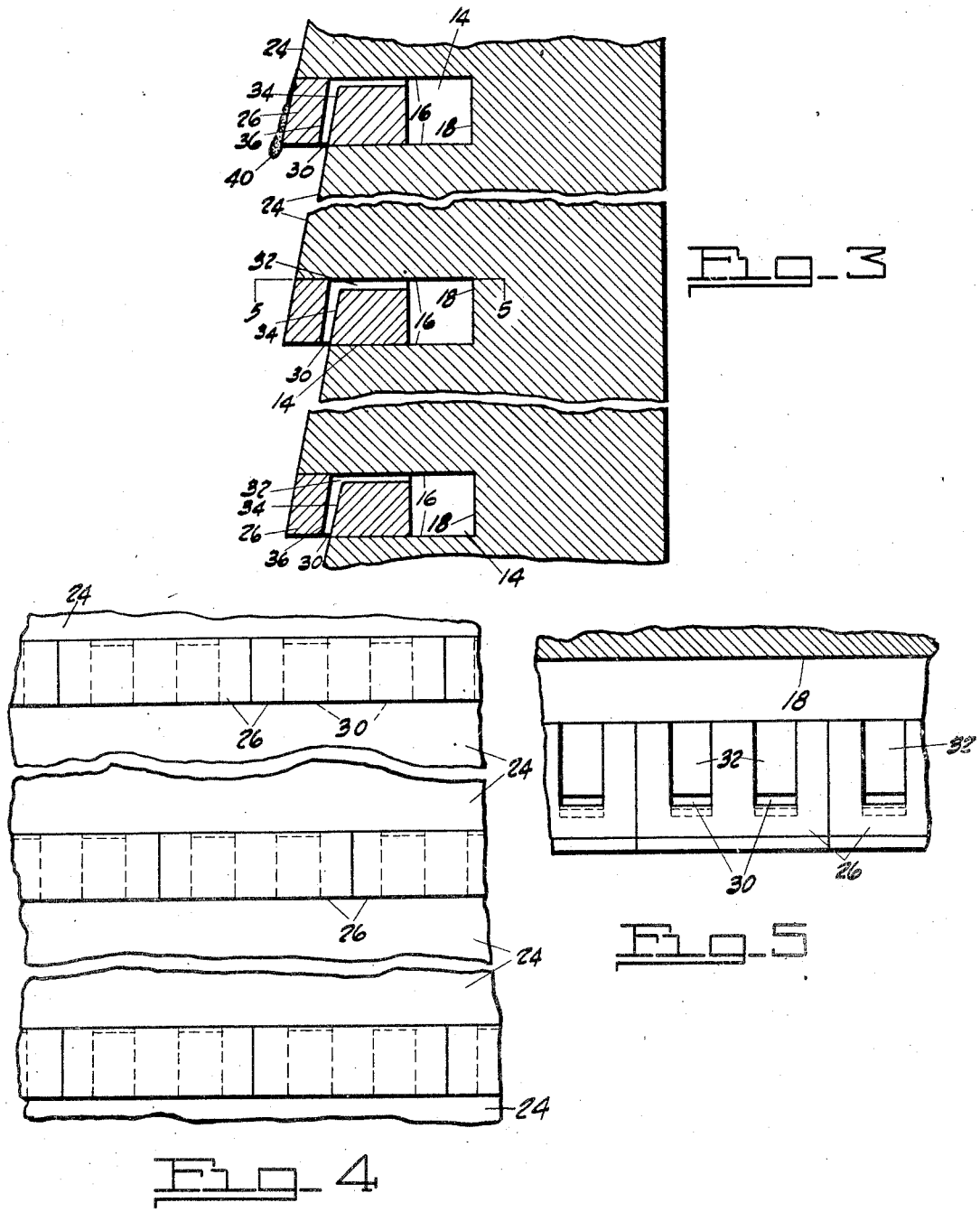

1,701,853

UNITED STATES PATENT OFFICE.

GEORGE PERCY JACKSON, OF NEW YORK, N. Y., ASSIGNOR TO COMBUSTION ENGINEERING CORPORATION, OF NEW YORK, N. Y., A CORPORATION OF NEW YORK.

FURNACE.

Application filed March 29, 1922. Serial No. 547,679.

The present invention has special reference to means for assisting combustion in a furnace, and reducing liability of clinkers and other injurious deposits forming on the wall of the fire-box of a furnace.

An object of the invention is to provide a novel and improved means of this character which is particularly adapted for use in a pulverized fuel furnace.

Another object of the invention is to provide a novel and improved combustion chamber for a furnace.

The several features of the invention whereby the above mentioned and other objects of the invention may be attained will be clearly understood from the following description and accompanying drawings, in which—

Fig. 1 is a longitudinal vertical sectional view, partly in elevation, of a portion of a pulverized fuel furnace embodying the features of the invention in their preferred form;

Fig. 2 is a transverse vertical sectional view taken on the line 2—2 of Fig. 1;

Fig. 3 is a vertical sectional view, on an enlarged scale and partly broken away, of a portion of a side wall of the fire-box of the furnace;

Fig. 4 is a front view of the portion of the side wall illustrated in Fig. 3; and Fig. 5 is a sectional plan view taken on the line 5—5 of Fig. 3.

The pulverized fuel furnace illustrated in the drawings is provided with a steam boiler 2, and a fire-box 4 having side walls 6, front wall 7, rear or bridge wall 8, a top wall 10, and a bottom wall 11. A pulverized fuel nozzle 12, suitably connected with a source of fuel supply is mounted in the top wall and is so arranged as to direct the pulverized fuel downwardly into the fire-box. In this type of furnace the combustion of the fuel takes place while the fuel is in suspension and the furnace draft tends to direct the suspended mass of burning fuel and the gases upwardly to the boiler as indicated by arrows in Fig. 1 of the drawings.

As illustrated the inner sides of the four vertical walls of the fire-box are each provided with recesses 14 extending the length thereof and arranged one above the other and spaced apart, with the recesses of the four walls opening one into the other to form a series of three recesses completely encompassing the interior of the fire-box. The recesses 14 are provided with horizontal upper and lower walls 16 and the recesses in the front and side walls of the fire-box are provided with an inner vertical wall 18. The recesses in the bridge wall 8 of the fire-box lead from an air chamber 20 formed in the bridge wall, which is connected at its lower end with a suitable source of air supply through a pipe 22. The portions of the walls of the fire-box between the recesses 14, the portions of the walls immediately below the lower recesses 14 and the portions of the walls above the upper recesses 14 are provided with downwardly and inwardly inclined surfaces 24. A series of blocks 26 of refractory material are arranged end to end in the recesses 14 so as to form three rows of blocks completely encompassing the interior of the fire-box. The blocks 26 in the front and side walls of the fire-box are spaced from the vertical walls of the recesses 14 so as to provide air passages 28 leading from the air chamber 20, and the blocks in the bridge wall 8 extend through the recesses, so that the three rows of blocks are completely surrounded by air spaces in communication with a source of air supply. The blocks 26 project a distance beyond the upper edges of the inclined surface 24 of the fire-walls, and the inner surfaces of the blocks are inclined similarly to the inclined surfaces 24 and form continuations thereof.

Each block 26 is provided with two downwardly directed air ducts 30 that are in communication with the air passages 28 and the air chamber 20, through two channels 32 in the top of the block. The walls 34 of the air ducts 30 are inclined the same as the inclined surfaces 24 of the fire-wall, and are so arranged as to form continuations of these surfaces. The other wall 36 of the air ducts 32 are at a less angle to the vertical than the walls 34 and these walls are so spaced as to provide a relatively wide and shallow passage between them that tapers downwardly.

With this construction it will be apparent that upon the admission of air to the air chamber 20 the air ducts 30 will direct thin films of air downwardly over the inclined surfaces 24 beneath the rows of blocks, respectively, and that this air after passing below the mass of burning fuel will be drawn upwardly by the furnace draft and thus assist combustion and tend to maintain the heavier particles of burning fuel in suspension that would otherwise drop to the bottom of the furnace only partially burned. The downwardly directed air for combustion in connection with the downwardly moving portion of the fuel and flame stream, is advantageous as there is less violent eddying of the descending stream than would be the case were the air admitted through the front wall or side wall in a direction transverse that of the descending fuel. Furthermore, where there are a plurality of burners there is a tendency of the air when admitted horizontally through the front wall, to short circuit some of the fuel directly to the tubes, particularly in the upper part of the combustion chamber before the individual streams of entering fuel have had opportunity to unite in one general stream. The downward admission of the air obviates this. In addition, the downward admission of the air causes such air to travel farther along with the fuel stream bordering it on the convex side before commingling takes place. This tends to insure the body of air for the heavier particles to gravitate into and there find the oxygen for combustion.

It may also be noted that the downward admission of air adjacent the ascending portion of the fuel is advantageous for the reason that at such place more violent eddying of the fuel and flame stream is required to secure the intimate admixture necessary to complete combustion. In the ascending portion of the fuel and flame stream there are large bodies of expanded gases and since the volume is so great there is need for more or less violent eddying to get the proper admixture. In contra-distinction the entering fuel has some of the air required for combustion with it and, therefore, a less measure of eddying is required.

It will also be apparent that the cooling effect of the air films on the inclined surfaces 24 of the fire wall will tend to prevent the formation of clinkers thereon and to prevent these surfaces from wearing away or spalling. These films of air directed over the inclined surfaces also will tend to prevent cinders or dust lodging on these surfaces and to direct it inwardly toward the center of the fire-box. In case any drip should be formed by the melting of dust on the projecting portions of the blocks 26, which form a drip ledge, the currents of air from the passages 30 by creating a cool air zone extending to the inner edge of the blocks would cooperate with the inclined inner surfaces of the blocks to cause the drip to solidify into a slag or clinker projecting downwardly and inwardly from the inner edge of the blocks in substantially the plane of the inclined inner surfaces as indicated at 40 in Figure 3, and it will be apparent that any further drip would solidify on the slag initially formed before it could reach the bottom sides of the projecting portions of the blocks, so that there is no danger of slag forming on these bottom side portions of the blocks and blocking the air passages.

While the features described above are well adapted for use in the type of furnace illustrated in the drawings, it is to be understood that, except as defined in the claims, certain features of the invention are not limited to use in a furnace embodying any or all of the other features as they may be used in other types of furnaces.

What I claim is:

1. A fire box for a pulverized fuel furnace of the class in which the combustion of the fuel takes place while it is in suspension, having one of its side walls provided with a horizontal recess extending longitudinally thereof, a series of blocks set into said recess and spaced from the back wall thereof so as to form an air passage between said wall of the recess and said blocks, the under side of said blocks projecting inwardly beyond the adjacent portion of the side wall, each of said blocks having a channel in its top surface leading from said air passage and spaced from the inner end of the block and an air duct leading from the channel downwardly through the bottom side of the block with the back wall of the duct substantially in the plane of the portion of the fire wall below the block.

2. A fire box for a furnace having a side wall thereof provided with a plurality of downwardly and inwardly inclined surfaces arranged one above the other, and a row of bricks defining the upper edge of each of said inclined surfaces, projecting a distance inwardly beyond said upper edge and having ducts of substantially the same inclination with their back walls arranged substantially in the same plane as the adjacent inclined surface beneath them for directing thin streams of air downwardly over said inclined surface.

3. A pulverized fuel furnace having, in combination, a combustion chamber having an outlet in an upper part thereof, means for admitting the fuel in an upper part of the chamber in a downward direction so that the fuel and flame stream reverts on itself in a substantially U-form, means for admitting a downwardly directed supporter of combustion between the furnace or chamber structure and the descending portion of the fuel and flame stream, and means for admitting a downwardly directed supporter of combustion between the chamber structure and the ascending portion of the fuel and flame stream.

4. A pulverized fuel furnace having, in combination, a combustion chamber having an outlet in an upper part thereof, means for admitting the fuel in an upper part of the chamber in a downward direction so that the fuel and flame stream will revert on itself in a substantially U-form, and means for admitting a downwardly directed body of air between the fuel and flame stream and the four upright walls of the chamber.

5. A pulverized fuel furnace having, in combination, a combustion chamber having an outlet in an upper part thereof, means for admitting the fuel in an upper part of the chamber in a downward direction so that the fuel and flame stream reverts on itself in a substantially U-form, and means for admitting a downwardly directed body of air between the fuel and flame stream and the four upright walls of the chamber at a plurality of points in the height of the chamber.

6. A pulverized fuel furnace having, in combination, a combustion chamber having an outlet in an upper part thereof, means for admitting the fuel and a portion of the air required for combustion in an upper part of the chamber in a downward direction, so that the fuel and flame stream reverts on itself in a substantially U-form, and means for admitting further air for combustion at successive points in the height of the furnace and below the point of admission of the fuel, such air being directed downwardly by said means.

7. A pulverized fuel furnace having, in combination, a combustion chamber, means for admitting the fuel adjacent the wall of the chamber and in a direction generally substantially parallel therewith, and means for admitting a combustion supporting medium through such wall in a stream directed thereby generally substantially parallel with the entering stream of fuel and at a point below the point of admission of the fuel.

8. A pulverized fuel furnace having, in combination, a combustion chamber, means for admitting the fuel adjacent the wall of the chamber and in a direction generally substantially parallel therewith, and means for admitting a combustion supporting medium through such wall in a stream directed thereby generally substantially parallel with the entering stream of fuel and moving in the same general direction and at a point below the point of admission of the fuel.

9. A pulverized fuel furnace having, in combination, a combustion chamber having an outlet in an upper part thereof, means for admitting the fuel at a point such that the fuel and flame stream in progress through the chamber rises toward said outlet, and means for admitting a downwardly directed body of air between the rising portion of the flame stream and the adjacent chamber wall structure.

10. A pulverized fuel furnace having, in combination, a combustion chamber having an outlet in an upper part thereof, means for admitting the fuel at a point such that the fuel and flame stream in progress through the chamber rises toward the outlet, and means for admitting a downwardly directed body of air between the rising portion of the flame stream and the adjacent chamber wall structure at a plurality of points in the height of the furnace.

11. In a furnace, a combustion chamber having a substantially vertical wall, means for introducing a stream of pulverized fuel mixed with air downwardly into the combustion chamber at a distance from said wall, and means for causing air under pressure to be introduced into the combustion chamber so that it flows downwardly along said wall in a thin, laterally extended stream substantially the width of the wall and wider than the fuel stream.

12. In a furnace, a combustion chamber having a substantially vertical wall and a draft outlet, means for introducing a stream of pulverized fuel mixed with air downwardly into the combustion chamber so that it takes a return bent course to the draft outlet, and means for introducing air to the combustion chamber between the fuel stream and wall provided with an air orifice approximately the width of the wall and with means for directing the air downwardly along said wall.

13. A furnace for the combustion of fine fuel, one wall of which is provided with a tuyère for the admission of supplementary air, the tuyère opening discharging parallel to the inner face of the wall and in the direction of flow of the products of combustion, and means for supplying a flow of air under pressure through said tuyère and along said wall.

14. In a furnace, a combustion chamber having a substantially vertical wall and a draft opening, means for introducing a stream of pulverized fuel mixed with air downwardly into the combustion chamber at a distance from said wall so that the fuel in combustion takes a return bent course through the combustion chamber, and means for causing air under pressure to be introduced into the combustion chamber so that it flows downwardly along said wall in a stream substantially wider than the fuel stream.

GEORGE PERCY JACKSON.